United States Patent
Miura et al.

(10) Patent No.: US 8,991,146 B2
(45) Date of Patent: Mar. 31, 2015

(54) FIBER-REINFORCED STRAND AND METHOD OF MANUFACTURING A FIBER-REINFORCED STRAND

(75) Inventors: Hodaka Miura, Kobe (JP); Naoyuki Tashiro, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 13/976,802

(22) PCT Filed: Dec. 13, 2011

(86) PCT No.: PCT/JP2011/078752
§ 371 (c)(1),
(2), (4) Date: Jun. 27, 2013

(87) PCT Pub. No.: WO2012/093561
PCT Pub. Date: Jul. 12, 2012

(65) Prior Publication Data
US 2013/0276421 A1  Oct. 24, 2013

(30) Foreign Application Priority Data
Jan. 4, 2011  (JP) ................................. 2011-000130

(51) Int. Cl.
*D02G 3/36* (2006.01)
*D02G 3/40* (2006.01)
*B29B 15/12* (2006.01)

(52) U.S. Cl.
CPC .................. *D02G 3/36* (2013.01); *D02G 3/404* (2013.01); *B29B 15/125* (2013.01)
USPC .......................................... 57/296

(58) Field of Classification Search
USPC ................ 57/7, 250, 251, 258, 292, 296, 297
See application file for complete search history.

(56) References Cited

U.S. PATENT DOCUMENTS 2,824,485 A * 2/1958 Gregory ............................. 87/1
3,889,455 A * 6/1975 Portinari et al. ..................... 57/7

(Continued)

FOREIGN PATENT DOCUMENTS

JP  59-199889 A  11/1984
JP  63-45038 A  2/1988

(Continued)

OTHER PUBLICATIONS

International Search Report issued corresponding International Application No. PCT/JP2011/078752, mailed Mar. 6, 2012, 1 page; Written Opinion of the International Searching Authority, 1 page.

*Primary Examiner* — Shaun R Hurley
(74) *Attorney, Agent, or Firm* — Studebaker & Brackett PC (57) ABSTRACT

In a method of manufacturing a fiber-reinforced strand, the fiber-reinforced strand is so manufactured that the cross-section thereof becomes as circular as possible. Particularly a method of causing a reinforced fiber bundle 3 to pass through a resin bath means 7 and, thereafter, twisting the reinforced fiber bundle 3. The resin bath means 7 includes an impregnation region 21 where the reinforced fiber bundle 3 is impregnated with a thermoplastic resin 5 and a twisting region 22 where the reinforced fiber bundle 3 after the resin impregnation can be twisted, and the reinforced fiber bundle 3 after the resin impregnation is twisted in such a manner that a twist pitch P imparted to the reinforced fiber bundle 3 after the resin impregnation within a length L in the twisting region 22 satisfies $L/3 \geq P \geq 3.15/90 \times (dtex)^{1/2}$.

1 Claim, 5 Drawing Sheets

(56) References Cited

U.S. PATENT DOCUMENTS

| | | | |
|---|---|---|---|
| 3,923,003 A * | 12/1975 | Carden | 118/405 |
| 3,960,050 A * | 6/1976 | Eisler | 87/1 |
| 4,297,835 A * | 11/1981 | Shimizu | 57/251 |
| 4,598,538 A * | 7/1986 | Moore, Jr. | 57/7 |
| 4,707,977 A | 11/1987 | Cousin et al. | |
| H1715 H * | 4/1998 | Longeat | 57/7 |
| 2010/0224309 A1 * | 9/2010 | Tashiro et al. | 156/148 |
| 2011/0001268 A1 * | 1/2011 | Tanaka et al. | 264/328.1 |
| 2011/0192132 A1 * | 8/2011 | Kimura et al. | 57/258 |
| 2012/0225149 A1 * | 9/2012 | Tashiro et al. | 425/112 |

FOREIGN PATENT DOCUMENTS

| | | |
|---|---|---|
| JP | 05-169445 A | 7/1993 |
| JP | 2006-231922 A | 9/2006 |
| JP | 2007-303006 A | 11/2007 |

* cited by examiner

FIBER-REINFORCED STRAND AND METHOD OF MANUFACTURING A FIBER-REINFORCED STRAND

TECHNICAL FIELD

The present invention relates to a fiber-reinforced strand and a method of manufacturing a fiber-reinforced strand.

BACKGROUND ART

Fiber-reinforced thermoplastic resins (FRTP) are light and excellent in strength. Out of these, long fiber-reinforced thermoplastic resins (LFRTP) containing long reinforced-fibers having a long fiber length are particularly excellent in terms of impact resistance and stiffness and are used in the form of strings, for example, as strings of a tennis racket.

As a method of manufacturing such a string-formed product of long fiber-reinforced thermoplastic resins (hereinafter, referred to as a "fiber-reinforced strand"), a method of causing a reinforced fiber bundle such as a plurality of glass rovings to pass through a resin bath means storing a molten thermoplastic resin, thereby impregnating the reinforced fiber bundle with the molten resin, and pulling out the reinforced fiber bundle after the resin impregnation from the resin bath means while twisting the reinforced fiber bundle about a bundle center is disclosed, for example, patent literatures 1 and 2.

CITATION LIST

Patent Literature

Patent literature 1: Japanese Unexamined Patent Publication No. H05-169445
Patent literature 2: Japanese Unexamined Patent Publication No. S59-199889

SUMMARY OF INVENTION

Technical Problem

In the conventional fiber-reinforced strand manufacturing methods, there have been cases where a twist pitch is short when twisting the reinforced fiber bundle after the resin impregnation, with the result that the cross-sectional shape of the fiber-reinforced strand does not become circular. For example, it is disclosed in patent literature 1 that the strand is twisted one turn while 0.3 m of the strand is taken up (twist pitch of 300 mm). This may lead to a problem of unstable quality of the fiber-reinforced strand (defects in external appearance and cross-sectional shape, variations of mechanical properties, etc.).

The present invention was developed in view of the above problem and an object thereof is to provide a fiber-reinforced strand which is so manufactured that the cross-section thereof becomes as circular as possible and, as a result, has high quality unaccompanied by an external appearance defect, variations of mechanical properties and the like and stable quality, and a method of manufacturing a fiber-reinforced strand capable of obtaining such a fiber-reinforced strand.

Solution to Problem

To achieve the above object, the present invention adopts the following technical measures.

Specifically, the present invention is directed to a fiber-reinforced strand produced by causing a reinforced fiber bundle to pass through a resin bath means storing a molten thermoplastic resin and twisting the reinforced fiber bundle after resin impregnation about a bundle center by a twisting means provided downstream of the resin bath means, characterized in that the resin bath means includes an impregnation region where the reinforced fiber bundle is impregnated with the thermoplastic resin and a twisting region where the reinforced fiber bundle after the resin impregnation can be twisted by the twisting means and the fiber-reinforced strand is produced by twisting the reinforced fiber bundle by the twisting means in such a manner that a twist imparted to the reinforced fiber bundle in the twisting region satisfies Equation (1).

[Equation 1]

$$\frac{L}{3} \geq P \geq \frac{3.15}{90}\sqrt{dtex} \quad (1)$$

where
  dteX: decitex of reinforced fibers
  L: length of the twisting region of the resin bath means (mm)
  P: twist pitch imparted to the reinforced fiber bundle (mm).

According the present invention, a circularity variation of the fiber-reinforced strand can be set to 5% or less.

The present invention is further directed to a method of manufacturing a fiber-reinforced strand by causing a reinforced fiber bundle to pass through a resin bath means storing a molten thermoplastic resin and twisting the reinforced fiber bundle after resin impregnation about a bundle center by a twisting means provided downstream of the resin bath means, characterized in that the resin bath means includes an impregnation region where the reinforced fiber bundle is impregnated with the thermoplastic resin and a twisting region where the reinforced fiber bundle after the resin impregnation can be twisted by the twisting means and the fiber-reinforced strand is produced by twisting the reinforced fiber bundle by the twisting means in such a manner that a twist imparted to the reinforced fiber bundle in the twisting region satisfies Equation (1).

[Equation 2]

$$\frac{L}{3} \geq P \geq \frac{3.15}{90}\sqrt{dtex} \quad (1)$$

where
  dtex: decitex of reinforced fibers
  L: length of the twisting region of the resin bath means (mm)
  P: twist pitch imparted to the reinforced fiber bundle (mm).

According the present invention, the cross-section of the manufactured fiber-reinforced strand becomes circular or approximates a circular shape, with the result that high quality free from an external appearance defect, variations of mechanical properties and the like is provided and quality becomes stable. Specifically, the fiber-reinforced strand having a circularity variation of 5% or less can be obtained.

Effects of Invention

According to the method of manufacturing a fiber-reinforced strand of the present invention, the fiber-reinforced strand can be so manufactured that the cross-section thereof becomes as circular as possible, with the result that it is possible to obtain the fiber-reinforced strand having high quality unaccompanied by an external appearance defect, variations of mechanical properties and the like and stable in quality.

DESCRIPTION OF EMBODIMENT

Hereinafter, a method of manufacturing a fiber-reinforced strand 1 according to the present invention is described with reference to the drawings.

Figure 1:
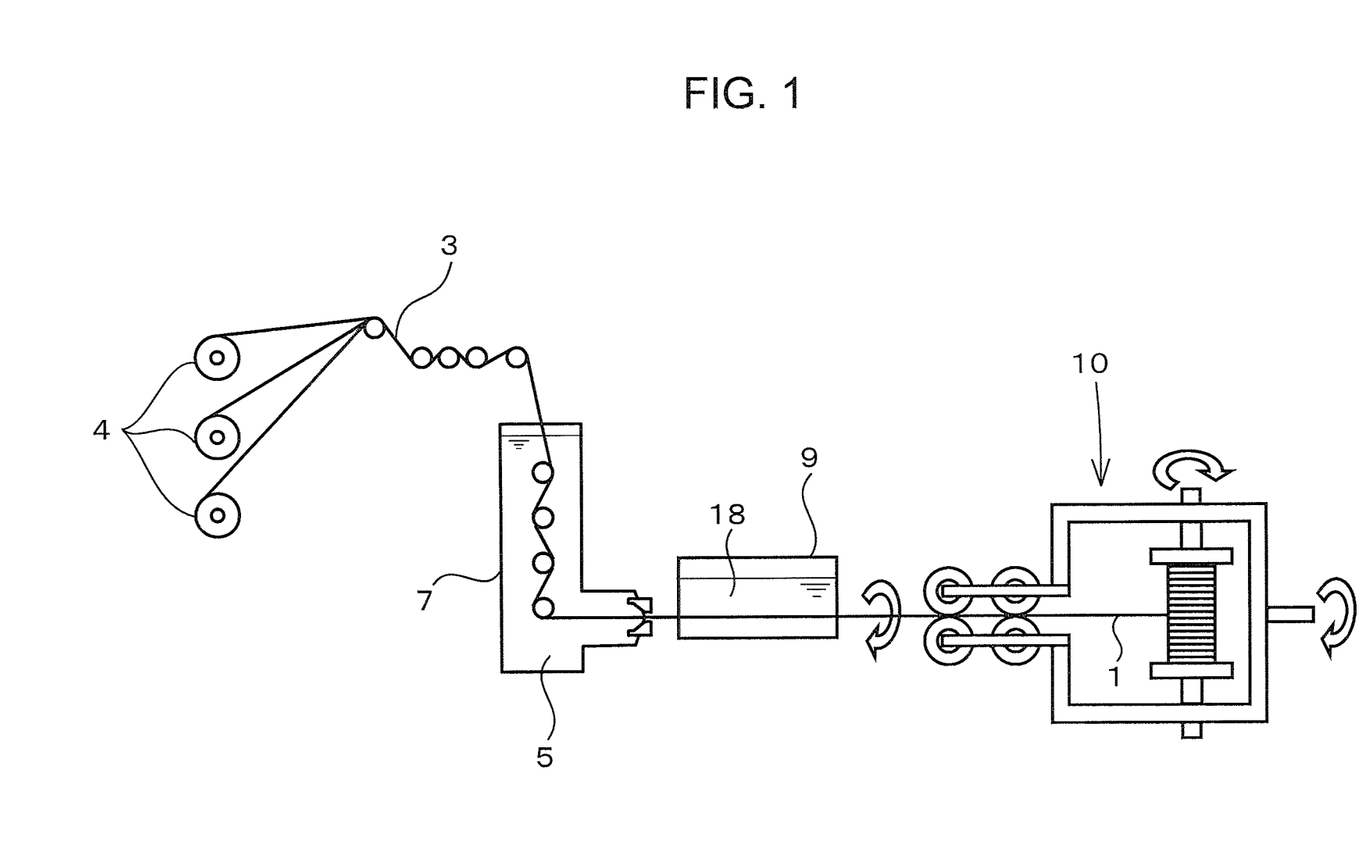
FIG. 1 is a front view of a manufacturing apparatus used in a manufacturing method of the present invention.
Figure 2:
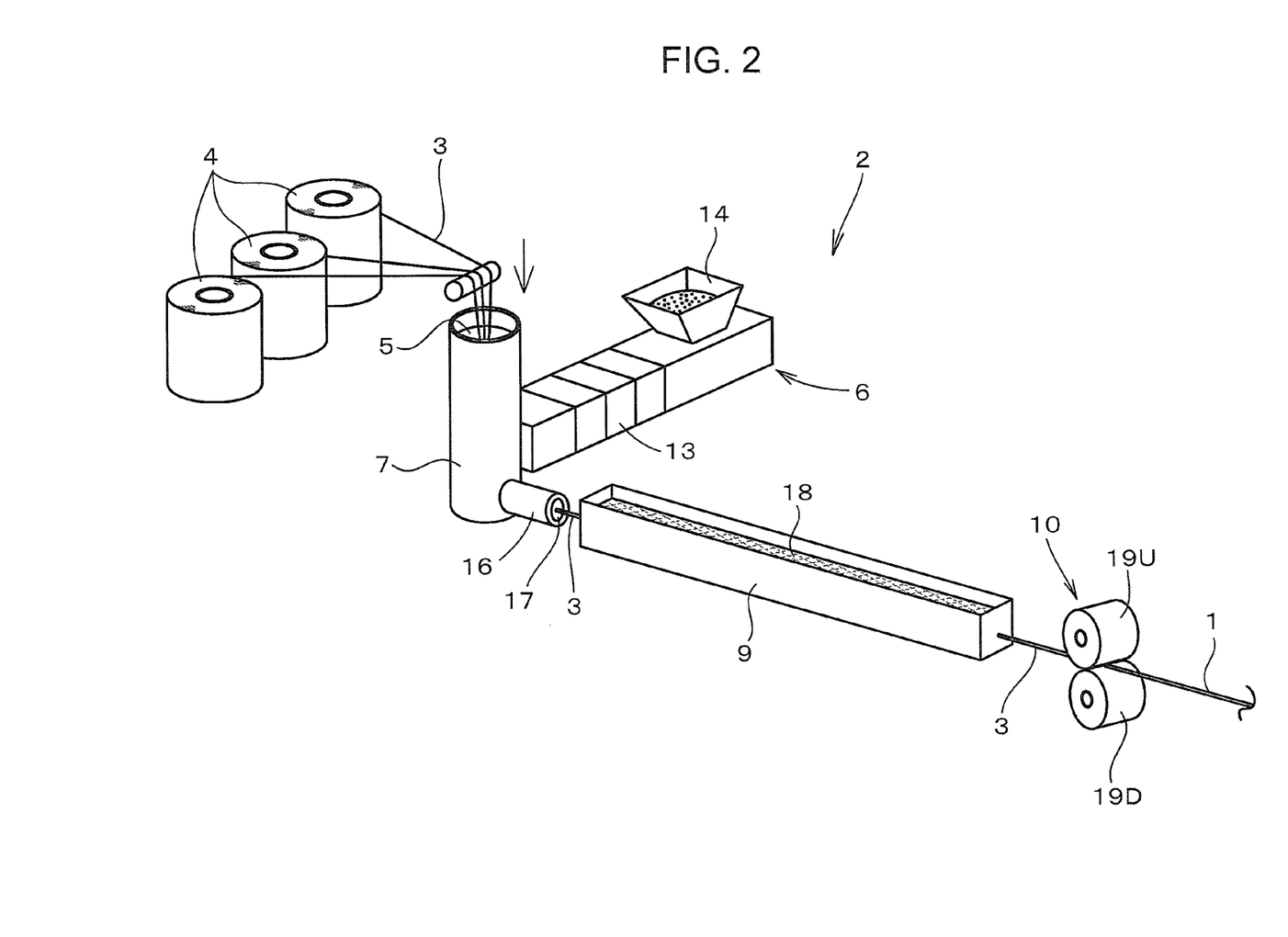
FIG. 2 is a perspective view of the manufacturing apparatus used in the manufacturing method of the present invention.

FIGS. 1 and 2 show an example of a strand manufacturing apparatus 2 used in the method of manufacturing the fiber-reinforced strand 1. This strand manufacturing apparatus 2 includes a plurality of (three in a shown example) fiber feeders 4 for feeding a coiled reinforced fiber bundle 3 at a predetermined speed, a kneading extruder 6 for kneading and melting a thermoplastic resin 5 as a raw material and a resin bath means 7 for impregnating the reinforced fiber bundle 3 fed from the fiber feeders 4 with the thermoplastic resin 5 plasticized in the kneading extruder 6.

This strand manufacturing apparatus 2 also includes a cooling means 9 arranged downstream of the resin bath means 7 for cooling the reinforced fiber bundle 3 after the resin impregnation fed out from the resin bath means 7, and a twisting means 10 arranged downstream of this cooling means 9 for mainly twisting the reinforced fiber bundle 3 before cooling about a bundle center.

Glass fibers, carbon fibers, organic synthetic resins such as aramids or metal fibers such as steel wires can be used as the reinforced fiber bundle 3. Further, polyolefin-based resin such as polypropylene or polyethylene, polyester-based resin such as polyethylene terephthalate or polybutylene terephthalate, polyamide-based resin such as nylon, polycarbonate-based resin, polyacetal, or polyphenylene sulfide can be used as the thermoplastic resin 5 to be impregnated into the reinforced fiber bundle 3.

The kneading extruder 6 includes a rotatable screw shaft (not shown) with kneading blades in a chamber 13 having a hollow interior, and the thermoplastic resin 5 as the raw material poured into the kneading extruder 6 from a hopper 14 is molten and plasticized in the kneading extruder 6.

Figure 3:
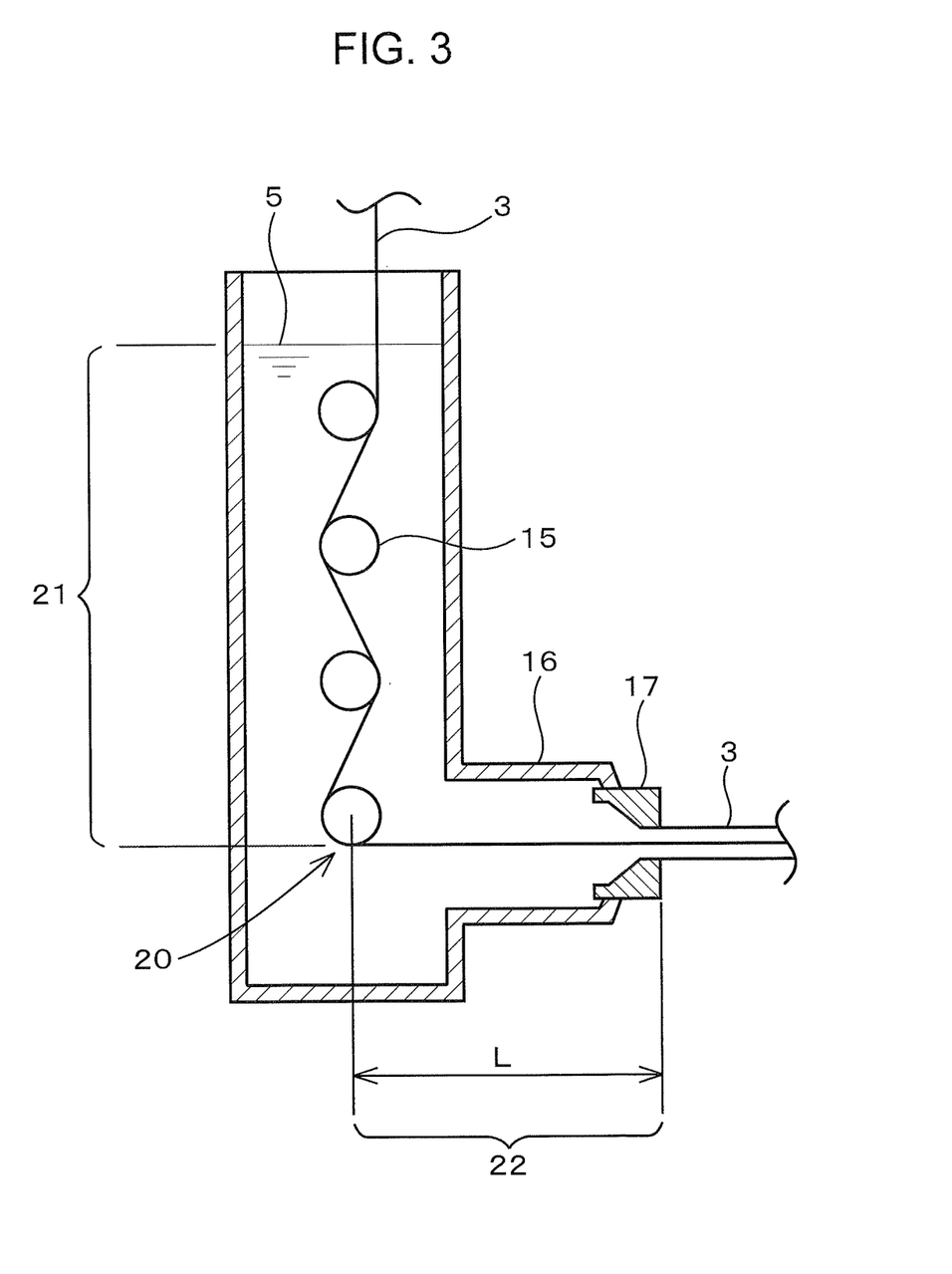
FIG. 3 is a side view in section showing a resin bath means.

The resin bath means 7 is in the form of a cylindrical tube, a tube axis direction of which extends in a vertical direction, and the thermoplastic resin 5 plasticized in the kneading extruder 6 is supplied into and stored in the tube interior thereof. An upper end part of the resin bath means 7 is open, so that the reinforced fiber bundle 3 can be pulled into the thermoplastic resin 5 stored in this resin bath means 7 through this upper end opening.

As shown in FIG. 3, a plurality of (four in a shown example) impregnation rolls 15 rotatably held in such a manner that axial centers extend in a horizontal direction are provided in parallel to each other and at a predetermined distance from each other in the vertical direction in this resin bath means 7. The reinforced fiber bundle 3 introduced through the upper end opening of the resin bath means 7 is successively passed through these impregnation rolls 15 in a meandering manner from top down.

An exit portion 16 through which the reinforced fiber bundle 3 after the resin impregnation is pulled out to outside is provided in a lower end part of the resin bath means 7. A die 17 for shaping the thermoplastic resin 5 covering the reinforced fiber bundle 3 to form a cross-sectional shape is provided in this exit portion 16.

In such a resin bath means 7, a position where the reinforced fiber bundle 3 after the resin impregnation is wound around the impregnation roll 15 arranged at the lowermost side and fed to the die 17 (lower end part of the outer circumferential surface of the lowermost impregnation roll 15) is set as a "demarcation point 20" and a region upstream (upward) of this demarcation point 20 and up to the level of the stored thermoplastic resin 5 is set as an "impregnation region 21" for impregnating the thermoplastic resin 5 into the reinforced fiber bundle 3.

On the other hand, the reinforced fiber bundle 3 impregnated with the thermoplastic resin 5 in the impregnation region 21 is in a state twistable about the bundle center thereof (state freely twistable about the bundle center) in a direction from the demarcation point 20 toward the die 17 (downstream side of the demarcation point 20). Specifically, in the resin bath means 7, a region downstream of the demarcation point 20 and up to the die 17 is set as a "twisting region 22" where the reinforced fiber bundle 3 can be twisted by the twisting means 10.

As just described, the resin bath means 7 includes the impregnation region 21 and the twisting region 22 inside.

The cooling means 9 is a water tank long in a direction in which the reinforced fiber bundle 3 after the resin impregnation is pulled out from the resin bath means 7 and cooling water 18 is stored in the tank. An entrance portion into which the reinforced fiber bundle 3 after the resin impregnation is introduced is provided on a tank wall most closely facing the exit portion 16 (die 17) of the rein bath means 7, and an exit portion through which the reinforced fiber bundle 3 after the resin impregnation is discharged is provided on a tank wall most distant from this entrance portion. Accordingly, in this cooling means 9, the thermoplastic resin 5 impregnated into and covering the reinforced fiber bundle 3 can be cooled and cured in the cooling water 18.

Various mechanisms can be adopted as the twisting means 10 arranged at the downstream side of the cooling means 9 and may be a mechanism for rotating a bobbin for taking up the fiber-reinforced strand 1 about the axial center of the fiber-reinforced strand 1 as shown in FIG. 1. On the other hand, as shown in FIG. 2, the twisting means 10 may be composed of a pair of upper and lower draw-off rollers 19U, 19D, the outer circumferential surfaces of which are held in contact with each other. The pair of these upper and lower draw-off rolls 19U, 19D are rotatable in rotating directions different from each other so as to feed the reinforced fiber bundle 3 after the resin impregnation fed out from the cooling means 9 further to the downstream side while sandwiching it in a facing state.

Specifically, the pair of upper and lower draw-off rolls 19U, 19D of this twisting means 10 also act to draw in the reinforced fiber bundle 3 from the fiber feeders 4 to the resin bath means 7 and draw out the reinforced fiber bundle 3 after the resin impregnation from the resin bath means 7 to the cooling means 9 and the twisting means 10 and constitute a draw-off means for the reinforced fiber bundle 3 and the fiber-reinforced strand 1 in the strand manufacturing apparatus 2. Note that a take-up means (not shown) may be separately provided downstream of the twisting means 10 and the manufactured fiber-reinforced strand 1 may be taken up on a bobbin or the like.

The pair of upper and lower draw-off rolls 19U, 19D are both arranged to extend in directions inclined with respect to a draw-off direction of the reinforced fiber bundle 3 after the resin impregnation, and the both draw-off rolls 19U, 19D extend at an equal angle and in different directions. Specifically, the rotation axis center of the upper draw-off roll 19U and that of the lower draw-off roll 19D are crossed in an X shape symmetric with respect to the draw-off axis of the reinforced fiber bundle 3 after the resin impregnation in a plan view.

Figure 4A:
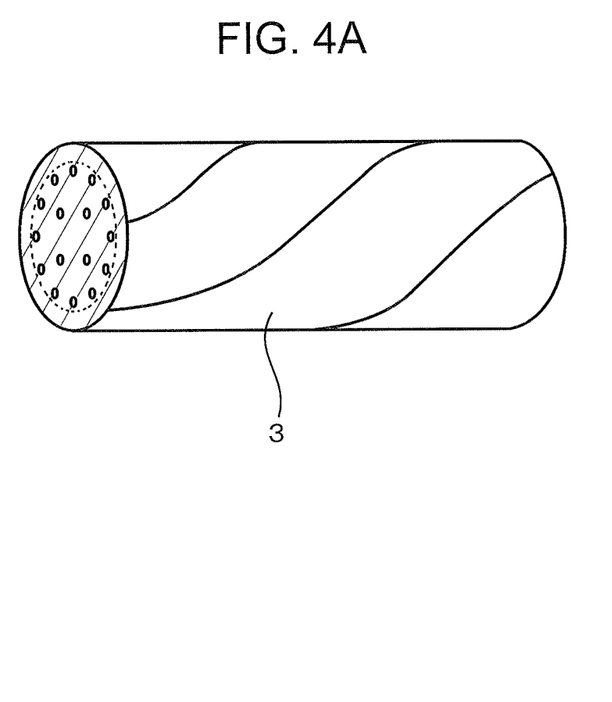
FIG. 4A is a perspective view of a fiber-reinforced strand.
Figure 4B:
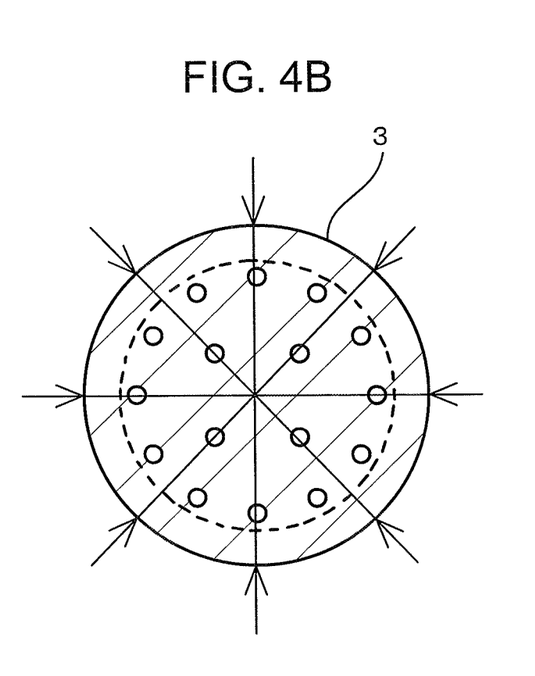
FIG. 4B is a sectional view of the fiber-reinforced strand.

Thus, when the reinforced fiber bundle 3 after the resin impregnation is sandwiched between the both draw-off rolls 19U, 19D, a twisting force (rotational force) about the bundle center is applied to this reinforced fiber bundle 3 and a twist equivalent to an angle of inclination of the both draw-off rolls 19U, 19D is imparted to the reinforced fiber bundle 3 after the resin impregnation as shown in FIG. 4A.

In this way, the twist applied by the twisting means 10 (both draw-off rolls 19U, 19D) is transferred to the upstream side from this twisting means 10 as a starting point and imparted to the reinforced fiber bundle 3 after the resin impregnation in a region up to the lowermost impregnation roll 15 (above demarcation point 20) arranged in the resin bath means 7.

However, as described above, in the reinforced fiber bundle 3 after the resin impregnation, the thermoplastic resin 5 impregnated in the resin bath means 7 is cooled and cured in the cooling means 9. Thus, the twist imparted to the reinforced fiber bundle 3 after the resin impregnation in a region including the cooling means 9 and downstream of that is almost solved by elastic restoration if the twisting force is released. Specifically, the "twist" imparted to the reinforced fiber bundle 3 after the resin impregnation by the twisting means 10 is substantially applied to the reinforced fiber bundle 3 after the resin impregnation in the twisting region 22 of the resin bath means 7.

In the manufacturing method of the present invention, the reinforced fiber bundle 3 after the resin impregnation is so twisted by the twisting means 10 that the twist imparted to the reinforced fiber bundle 3 after the resin impregnation in the twisting region 22 of the resin bath means 7 satisfies Equation (1).

[Equation 3]

$$\frac{L}{3} \geq P \geq \frac{3.15}{90} \sqrt{dtex} \qquad (1)$$

where
dtex: decitex of reinforced fibers
L: length of the twisting region of the resin bath means (mm)
P: twist pitch imparted to the reinforced fiber bundle (mm)

By specifying upper and lower limit values of the twist pitch P, i.e. specifying upper and lower limit values of the twist number imparted to the reinforced fiber bundle in this way, the cross-section of the manufactured fiber-reinforced strand 1 becomes as circular as possible, with the result that an external appearance defect, a cross-sectional shape defect, variations of mechanical properties and the like do not occur (high quality is obtained) and quality becomes stable.

It is confirmed by a test to be described later (results of FIG. 5) that the cross-sectional diameter of the fiber-reinforced strand 1 largely varies and the cross-sectional shape becomes a distorted circular shape unless the twist number (inverse of the twist pitch P) satisfies Equation (1).

The lower limit value of the twist pitch P imparted to the reinforced fiber bundle 3 after the resin impregnation is determined by a relational expression using a twist coefficient TF shown in Equation (2).

[Equation 4]

$$P \geq \frac{3.15}{TF} \sqrt{dtex} \qquad (2)$$

Dtex (decitex) denotes weight (g) of the reinforced fiber bundle 3 per 10,000 m and TF denotes the twist coefficient (TF=90) of the reinforced fiber bundle 3.

Example

A test was conducted which confirmed good quality and quality stability of the fiber-reinforced strand 1 manufactured by the manufacturing method according to the present invention by manufacturing fiber-reinforced strands while varying the length L of the twisting region 22 in the resin bath means 7 and an exit-side inner diameter (nozzle diameter) of the die 17 and measuring a variation in cross-sectional diameter of the fiber-reinforced strands.

The reinforced fiber bundle 3 used in the test was made up of glass fibers (glass rovings) and the thermoplastic resin 5 was polypropylene (PP).

Note that the length L of the twisting region 22 is preferably 40 mm to 400 mm. More preferably, the length L is 100 mm to 200 mm. If the length L is shorter than 40 mm, a configuration of an apparatus to set the twisting region 22 in the resin bath means 7 becomes difficult, which causes a viability problem. Further, if the length L is longer than 400 mm, there is a problem that fracture occurs frequently as tension created in the reinforced fiber bundle 3 increases due to the resistance of the thermoplastic resin 5.

Specifically, the length L was set at 45 mm and 195 mm and the exit-side inner diameter (nozzle diameter) of the die 17 was set at 1.1 mm, 2.1 mm and 3.0 mm.

The cross-sectional diameter of the manufactured fiber-reinforced strand 1 was measured at a total of four positions per cross-section at an interval of 45° in a circumferential direction using a micrometer, whereby a degree of variation (standard deviation of the diameter/average value of the diameter) on the cross-section was obtained.

Further, the twist pitch P was obtained by drawing a spiral line corresponding to the twist on the surface of the reinforced fiber bundle 3 by bringing a pen tip of a fixed oil pen into contact with the reinforced fiber bundle after the resin impregnation between the twisting means 10 and the cooling means 9 (near the twisting means 10) and counting the number of spirals of the line on the fiber-reinforced strand having exited from the twisting means 10 within a dimension equivalent to the length L of the twisting region 22.

Figure 5:
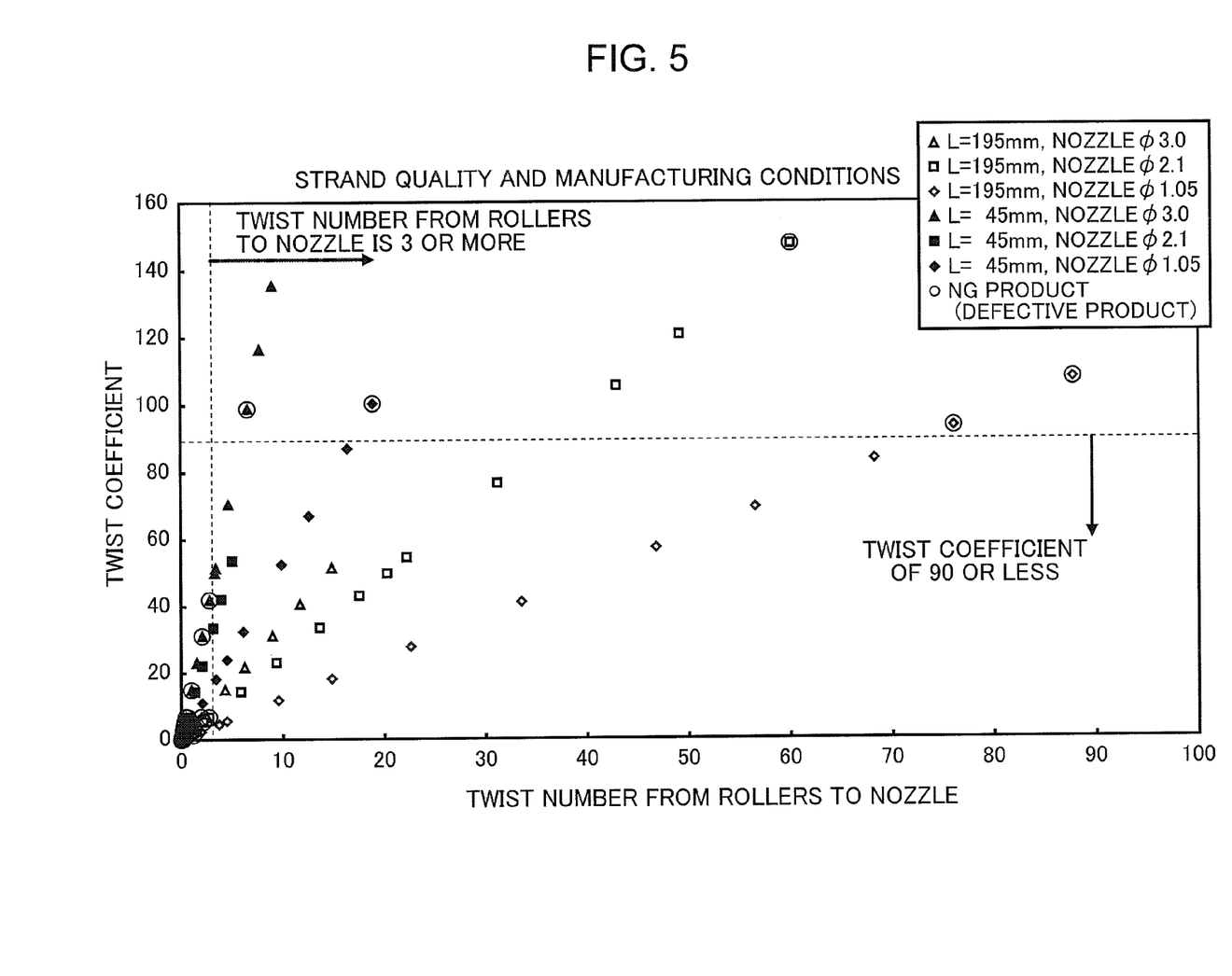
FIG. 5 is a graph showing a relationship of the twist number, twist coefficient and cross-sectional shape of the fiber-reinforced strand.

FIG. 5 shows test results collected on the upper and lower limit values of the twist pitch P. As is clear from FIG. 5, the degree of variation of the cross-sectional diameter is reliably reduced to 5% or less by setting the twist number (inverse of the twist pitch P) at 3 or more and the twist coefficient at 90 or less (those above 5% are written as NG products (defective products) in FIG. 5). That is, if being twisted three times before reaching the die 17, the loose reinforced fiber bundle 3, is contracted into a circular shape about a center of rotation and the circularity of the fiber-reinforced strand 1 is improved. On the other hand, if the reinforced fiber bundle 3 is twisted too much, things like lumps are formed to deteriorate the circularity. Specifically, the condition of the twist pitch preferably satisfies Equation (1).

The present invention is not limited to the above embodiment and the shapes, structures, materials, combinations and the like of the respective members can be appropriately changed without changing the essence of the present invention.

The number of the fibers making up the reinforced fiber bundle 3 (the number of coils prepared as the fiber feeders 4) may be one, four or more.

The twisting means 10 can also be so configured as to rotate a bobbin holding frame for taking up the fiber-reinforced strand 1 on the bobbin about an axial center about which the fiber-reinforced strand 1 is taken up (configuration illustrated in patent literature 2).

The cooling means 9 can also adopt a spray method by cooling water, a cooling method in air, an injection cooling method by cooling gas and the like.

REFERENCE SIGNS LIST 1 fiber-reinforced strand
2 strand manufacturing apparatus
3 reinforced fiber bundle
4 fiber feeder
5 thermoplastic resin
6 kneading extruder
7 resin bath means
9 cooling means
10 twisting means
13 chamber
14 hopper
15 impregnation roll
16 exit portion
17 die
18 cooling water
19U upper draw-off roll
19D lower draw-off roll
20 demarcation point
21 impregnation region
22 twisting region
D swing amplitude
L length in twisting region
P twist pitch
TF twist coefficient

The invention claimed is:

1. A method of manufacturing a fiber-reinforced strand by causing a reinforced fiber bundle to pass through a resin bath means storing a molten thermoplastic resin and twisting the reinforced fiber bundle after resin impregnation about a bundle center by a twisting means provided downstream of the resin bath means, wherein the resin bath means includes an impregnation region where the reinforced fiber bundle is impregnated with the thermoplastic resin and a twisting region where the reinforced fiber bundle after the resin impregnation can be twisted by the twisting means, and the fiber-reinforced strand is produced by twisting the reinforced fiber bundle by the twisting means in such a manner that a twist imparted to the reinforced fiber bundle in the twisting region satisfies Equation (1):

$$\frac{L}{3} \geq P \geq \frac{3.15}{90}\sqrt{dtex} \qquad (1)$$

where
dtex: decitex of reinforced fibers
L: length of the twisting region of the resin bath means (mm)
P: twist pitch imparted to the reinforced fiber bundle (mm).

* * * * *